May 21, 1946.  J. W. PRIOUR  2,400,781
COAT FOR ANIMALS
Filed April 25, 1945  2 Sheets-Sheet 2
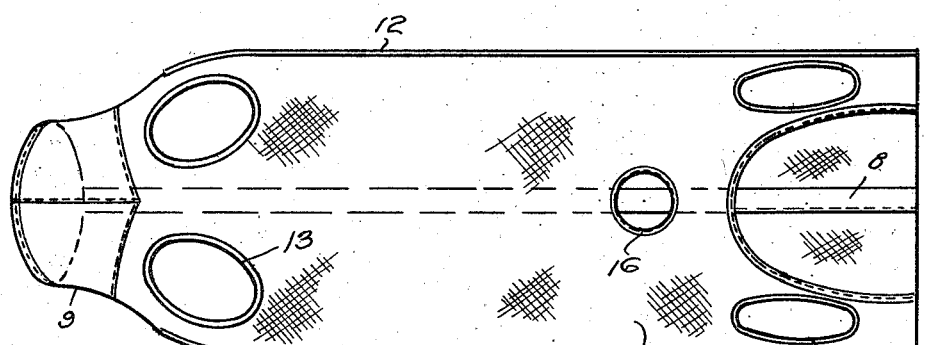
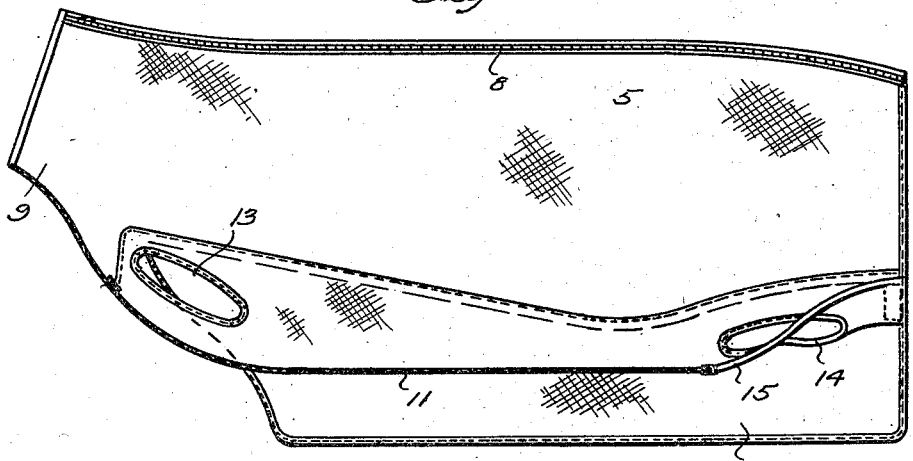
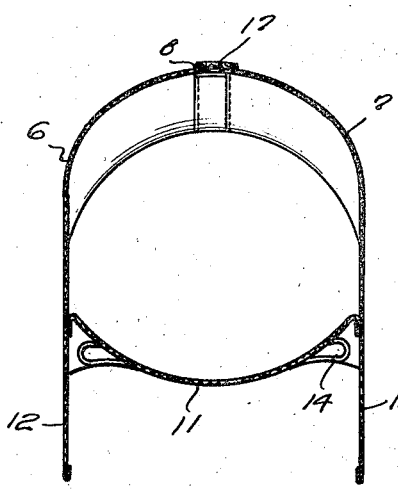
Inventor
James W. Priour,
By *Clarence A. O'Brien
and Harvey B. Jacobson*
Attorneys Patented May 21, 1946

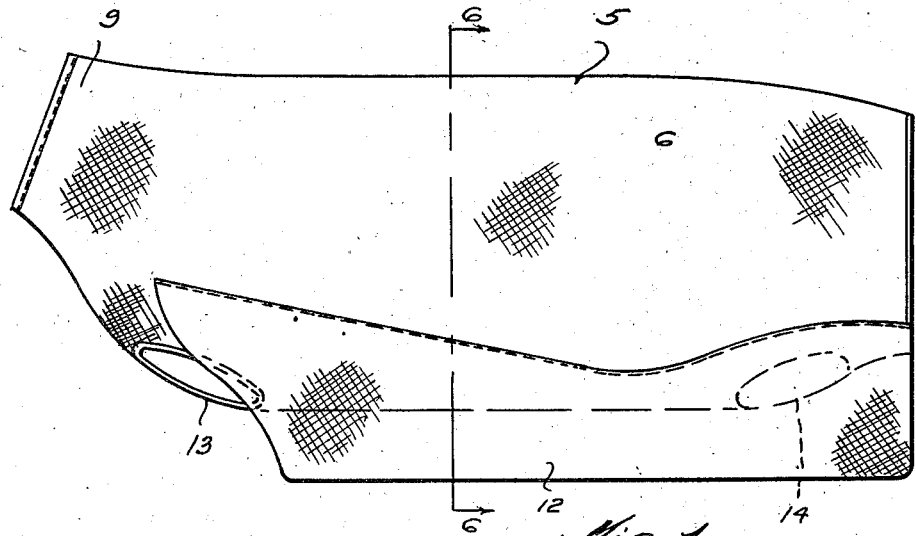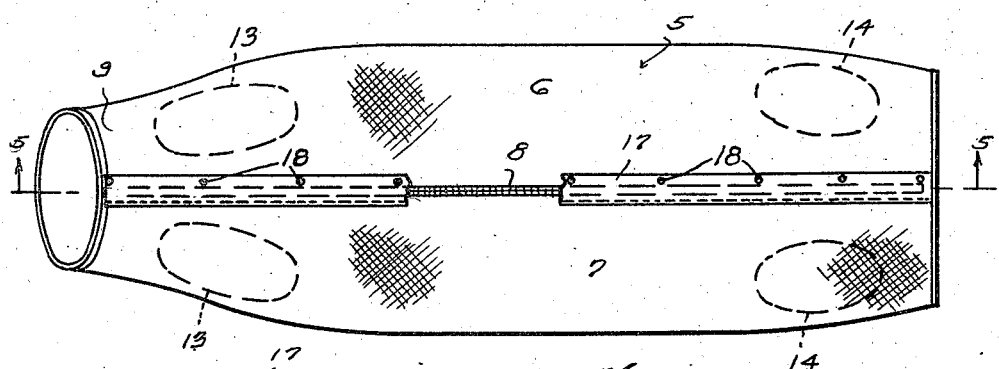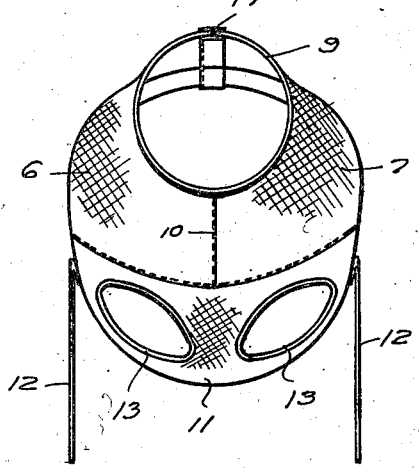

2,400,781

UNITED STATES PATENT OFFICE 2,400,781

COAT FOR ANIMALS

James W. Priour, Ingram, Tex.

Application April 25, 1945, Serial No. 590,298

2 Claims. (Cl. 54—79)

The present invention relates to a new and useful improvement in coats for animals, and more particularly to a coat of this character which may be applied to goats immediately following the shearing thereof so as to protect the animal from the inclemencies of the weather and from exposure to sudden changes in temperature which frequently causes a high death rate in animals of this character.

After Angora goats have been sheared it is important to protect the animal until a sufficient growth of mohair has grown on the animal to afford natural protection and it is accordingly an object of the present invention to provide a coat which may be easily and quickly placed in position on the animal and removed therefrom, when desired, and which effectively serves its purpose as a protecting medium without limiting the freedom of movement of the limbs of the animal.

An important object of the present invention is to provide a coat of this character adapted for covering the entire body of the animal and including side flaps extending downwardly at each side of the animal as a further protecting means for the legs thereof.

A further object of invention is to provide an article of this character of simple and practical construction which is efficient and reliable in the use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a front elevational view.

Figure 4 is a bottom plan view.

Figure 5 is a longitudinal sectional view taken substantially on a line 5—5 of Figure 2, and Figure 6 is a transverse sectional view taken substantially on a line 6—6 of Figure 1.

Referring now to the drawings in detail wherein for the purpose of illustration, I have disclosed a preferred embodiment of the invention. The numeral 5 designates the coat generally, preferably constructed of heavy duck or other suitable waterproof material and formed of a pair of side sections 6 and 7 which are connected at their upper edges by a longitudinally extending zipper or similar conventional form of fastener 8 which extends longitudinally from the front to rear edges of the garment.

The front ends of the side members 6 and 7 taper to form the neck engaging portion 9 and the front portion of the side members at their underside extend under the neck of the animal and are connected to each other by stitching 10 to a point immediately in advance of the front legs of the animal.

A bottom section 11 is attached at its side edges to the inside of the side sections 6 and 7 at a point above the lower edges of the latter as indicated in Figure 6 of the drawings, the bottom section 11 extending under the animal from the rear end of the stitching 10 forming the neck portion 9 to the rear end of the side members.

The lower portion of the side members 6 and 7 below the bottom section 11 forms downwardly extending flaps 12 at each side of the animal.

The bottom section 11 at its front portion is formed with a pair of leg openings 13 and is likewise formed adjacent its rear end with a pair of rear leg openings 14.

The rear edge of the bottom section 11 is also formed with an inwardly curved cutout portion 15 to prevent the wetting of the garment by the animal and when the garment is placed on a male animal the bottom section 11 is also formed with an opening 16 adjacent its rear edge to prevent the wetting of the garment by the animal.

The zipper or slide fastener 8 is provided with a protective flap 17 which is attached at one end to one of the side sections of the garment, the protective flap extending throughout the length of the zipper and its free edge is secured to the other section of the garment by means of snap fasteners 18.

In placing the garment on an animal the fastener 8 is opened its full length so that the side sections 6 and 7 will be completely opened at the top thereof and the legs of the animal inserted in the front and rear openings 13 and 14 and the side sections then folded upwardly over the back of the animal and connected by the fastener 8.

The entire body of the animal is thus protected and the downwardly extending side flaps 12 add further protection to the lower portion of the body as well as to the upper portions of the legs of the animal.

In view of the foregoing description taken in conjunction with the accompanying drawings it is believed that a clear understanding of the construction, operation and advantages of the device will be quite apparent to those skilled in the art.

A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. An animal coat comprising a pair of side sections, means for detachably connecting the upper edges of said side sections to each other along the back of the animal, a bottom section connecting the lower portion of the side sections and having leg openings therein, and downwardly extending flaps at the lower edges of said side sections.

2. An animal coat comprising a pair of side sections, means for detachably connecting the upper edges of said side sections to each other along the back of the animal, said side sections being connected at their front ends under the neck of the animal, a bottom section secured at its side edges to said side sections rearwardly of their front connected edges and above the lower edges of said side sections to form flaps extending downwardly at the sides of the coat below said bottom section, and leg openings in said bottom section.

JAMES W. PRIOUR.